Oct. 24, 1967 W. H. PRICE 3,348,899
ZOOM OBJECTIVE
Filed May 13, 1964
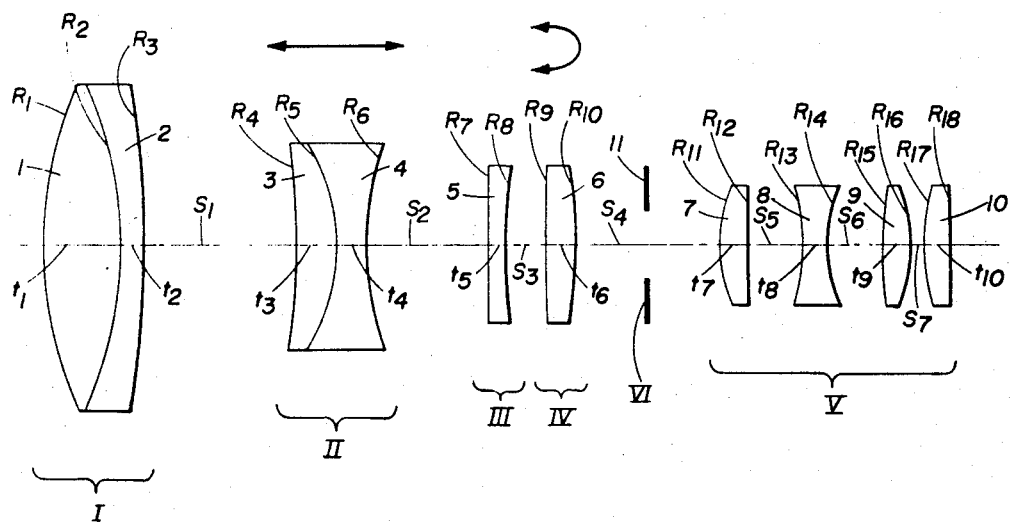
WILLIAM H. PRICE
INVENTOR.
BY R. Frank Smith
Leonard W. Treash
ATTORNEYS

United States Patent Office 3,348,899
Patented Oct. 24, 1967

3,348,899
ZOOM OBJECTIVE
William H. Price, Rochester, N.Y., assignor to Eastman Kodak Company, Rochester, N.Y., a corporation of New Jersey
Filed May 13, 1964, Ser. No. 367,157
2 Claims. (Cl. 350—184)

This invention relates to a zoom objective for movie cameras and more particularly to a zoom objective which is highly corrected over a substantial range of magnification, compact of size and inexpensive to manufacture.

Fairly complex zoom objectives which are highly corrected at all points of the zoom range are known. The problem solved by the present invention is that of obtaining such correction with a relatively inexpensive lens which is compact enough to be practical on a hand-held movie camera.

Restrictions as to cost and size can of course be met by using the simplest of systems, but correction of aberrations is then far from adequate. According to the present invention, all of the above requirements are met by proper choice of surface curvatures, etc. in a zoom system consisting of a positive doublet, an axially movable negative doublet, a single element fixed negative component and a slightly movable single element positive component which maintains the rear focus mechanically. These four components (herein collectively called the front zoom member) are positioned in front of the main objective of the system (herein called the rear member). To best cooperative with the front zoom member, a rear member composed of a triplet with the rearmost component made of two separated positive elements has been found to maintain the corrections and compactness which are the objects of the present invention. In fact, this relatively simple system has corrections throughout its range which are comparable with the more complex prior systems which cover only a slightly greater range. The actual values of the surface curvatures, etc. which give the high degree of correction with such a simple arrangement are set forth below.

The terms "front" and "rear" as used herein shall refer to the ends of the objective which are respectively farthest from and closest to the short conjugate thereof.

The accompanying drawing is a diagrammatic axial section of a zoom objective according to the invention.

According to the drawing, the zoom objective contains a front zoom member composed of components, I, II, III and IV and a fixed rear member V.

In the front zoom member, components I and III are fixed while component II moves to vary magnification. Component IV is mechanically coupled to component II, moving differentially therefrom to maintain focus. Components I and II are cemented doublets, component I, containing lens elements 1 and 2, being positive and component II, containing lens elements 3 and 4, being negative. Components III and IV, lens elements 5 and 6 respectively, are a doublet which has been split to concentrate more power in the positive moving component IV, thereby requiring less movement and giving more compactness.

Mechanically coupling component II with component IV may be done by several known means, for example, see the patent to W. A. Martin, U.S. 3,062,102.

The rear member V is shown with four airspaced lens elements 7, 8, 9 and 10. Elements 7, 9 and 10 are positive and 8 is negative thus forming essentially a triplet with the rear component composed of two separated positive elements. This form of rear member is shown as an example only, since other forms of rear member are suitable for use with the front zoom member disclosed.

A preferred example of a zoom objective according to this invention may be constructed according to the following data:

| Lens Element | N | V | Radii, mm. | Thickness or Separation, mm. |
|---|---|---|---|---|
| 1 | 1.611 | 58.8 | $R_1 = +50.89$ | $t_1 = 7.40$ |
| 2 | 1.649 | 33.8 | $R_2 = -37.04$ | $t_2 = 2.02$ |
|   |   |   | $R_3 = -390.3$ | $S_1$ varies |
| 3 | 1.720 | 29.3 | $R_4 = -80.55$ | $t_3 = 3.57$ |
| 4 | 1.697 | 56.2 | $R_5 = -15.98$ | $t_4 = 1.80$ |
|   |   |   | $R_6 = +21.70$ | $S_2$ varies |
| 5 | 1.649 | 33.8 | $R_7 = \infty$ | $t_5 = 1.07$ |
|   |   |   | $R_8 = +61.33$ | $S_3$ varies |
| 6 | 1.611 | 58.8 | $R_9 = +158.7$ | $t_6 = 2.16$ |
|   |   |   | $R_{10} = -32.96$ | $S_4$ varies |
| 7 | 1.697 | 56.2 | $R_{11} = +11.83$ | $t_7 = 3.20$ |
|   |   |   | $R_{12} = +203.0$ | $S_5 = 2.94$ |
| 8 | 1.720 | 29.3 | $R_{13} = -22.61$ | $t_8 = 1.06$ |
|   |   |   | $R_{14} = +11.40$ | $S_6 = 4.09$ |
| 9 | 1.611 | 58.8 | $R_{15} = +43.01$ | $t_9 = 2.80$ |
|   |   |   | $R_{16} = -16.52$ | $S_7 = 0.12$ |
| 10 | 1.611 | 58.8 | $R_{17} = +29.16$ | $t_{10} = 2.00$ |
|   |   |   | $R_{18} = -137.9$ |   |

The overall length of the lens is 88 mm. The stop is preferably placed in front of lens element 7 at an axial distance of 5.71 mm. therefrom.

In the above table, the lens elements in the first column are numbered from front to rear from 1 to 10 as shown in the drawing, the refractive index N of the glass for the D line of the spectrum and the dispersive index V are shown in the next two columns, respectively, the radii of curvature R of the lens surfaces are given in the fourth column and the thickness $t$ of the lens elements and the separations S between lens elements are shown in the last column. All subscripts in the table correspond to the numbering from front to rear shown in the drawing.

The airspaces $S_1$, $S_2$, $S_3$ and $S_4$ are variable and are given for a series of equivalent focal lengths from 12.10 to 36.29 in the following table, in which all measurements are in millimeters:

| Equivalent Focal Length | $S_1$ | $S_2$ | $S_3$ | $S_4$ |
|---|---|---|---|---|
| 12.10 (wide angle) | 2.50 | 34.56 | 2.12 | 14.58 |
| 17.00 | 14.00 | 23.06 | 4.30 | 12.40 |
| 22.87 (median) | 22.12 | 14.94 | 4.99 | 11.71 |
| 29.66 | 28.00 | 9.06 | 4.35 | 12.35 |
| 36.29 (telephoto) | 31.86 | 5.20 | 2.87 | 13.83 |

A zoom objective constructed according to the above data will have a constant back focal length of 15.28 mm. It is highly corrected for apertures up to at least $f/1.9$ throughout a 3 to 1 magnification.

The invention has been described in detail with particular reference to preferred embodiments thereof, but it will be understood that variations and modifications can be effected within the spirit and scope of the invention as described hereinabove and as defined in the appended claims.

I claim:
1. A zoom objective with a front zoom member and a rear converging member, the front zoom member comprising four components made up of six elements, from front to rear, a positive biconvex doublet, a negative bi- concave doublet, a single negative element and single positive element, the negative biconcave doublet being movable to vary the magnification of the objective and the single positive element being movable and mechanically coupled with said biconcave doublet so that the back focal length of the objective is substantially constant for all settings of the two movable members, said front zoom member being characterized in that its elements conform to the following table:

| Lens Element | N | V | Radii, mm. | Thickness or Separation, mm. |
|---|---|---|---|---|
| 1 | 1.61 | 58.8 | $R_1 = +50.9$ | $t_1 = 7.40$ |
|   |      |      | $R_2 = -37.0$ | $t_2 = 2.02$ |
| 2 | 1.65 | 33.8 | $R_3 = -390$  |                             |
|   |      |      |               | $S_1$ varies 2.50 to 31.9 |
| 3 | 1.72 | 29.3 | $R_4 = -80.5$ | $t_3 = 3.57$ |
|   |      |      | $R_5 = -16.0$ | $t_4 = 1.80$ |
| 4 | 1.70 | 56.2 | $R_6 = +21.7$ |                             |
|   |      |      |               | $S_2$ varies 34.56 to 5.20 |
|   |      |      | $R_7 = \infty$ | $t_5 = 1.07$ |
| 5 | 1.65 | 33.8 | $R_8 = +61.3$ |                             |
|   |      |      |               | $S_3$ varies 2.12 to 4.99 |
|   |      |      | $R_9 = +159$  | $t_6 = 2.16$ |
| 6 | 1.61 | 58.8 | $R_{10} = -33.0$ |                          | where from front to rear $R_1$ to $R_{10}$ are the radii of curvature of the surfaces, $t_1$ to $t_6$ the thicknesses of the lens elements, $S_1$ to $S_3$ the separations of the components, N the refractive indexes for the D line of the spectrum and V the dispersive indexes.

2. A zoom objective comprising a front zoom member and a rear converging member, the front zoom member having four components made up of six elements, from front to rear, a positive biconvex doublet, a negative biconcave doublet, a single negative element, and a single positive element, the negative biconcave doublet being movable to vary the magnification of the objective and the single positive element being movable and mechanically coupled with said biconcave doublet so that the back focal length of the objective is substantially constant for all settings of the two movable members, said rear converging member having four single elements, running from front to rear, a positive element, a negative element and two positive elements, said zoom objective being further characterized in that its elements conform to the following table:

| Lens Element | N | V | Radii, mm. | Thickness or Separation, mm. |
|---|---|---|---|---|
| 1 | 1.61 | 58.8 | $R_1 = +50.9$ | $t_1 = 7.40$ |
|   |      |      | $R_2 = -37.0$ | $t_2 = 2.02$ |
| 2 | 1.65 | 33.8 | $R_3 = -390$  |                             |
|   |      |      |               | $S_1$ varies 2.50 to 31.9 |
| 3 | 1.72 | 29.3 | $R_4 = -80.5$ | $t_3 = 3.57$ |
|   |      |      | $R_5 = -16.0$ | $t_4 = 1.80$ |
| 4 | 1.70 | 56.2 | $R_6 = +21.7$ |                             |
|   |      |      | $R_7 = \infty$ | $S_2$ varies 34.6 to 5.20 |
| 5 | 1.65 | 33.8 | $R_8 = +61.3$ | $t_5 = 1.07$ |
|   |      |      | $R_9 = +159$  | $S_3$ varies 2.12 to 4.99 |
| 6 | 1.61 | 58.8 | $R_{10} = -33.0$ | $t_6 = 2.16$ |
|   |      |      | $R_{11} = +11.8$ | $S_4$ varies 14.6 to 11.7 |
| 7 | 1.70 | 56.2 | $R_{12} = +203$ | $t_7 = 3.20$ |
|   |      |      | $R_{13} = -22.6$ | $S_5 = 2.94$ |
| 8 | 1.72 | 29.3 | $R_{14} = +11.4$ | $t_8 = 1.06$ |
|   |      |      | $R_{15} = +43.0$ | $S_6 = 4.09$ |
| 9 | 1.61 | 58.8 | $R_{16} = -16.5$ | $t_9 = 2.80$ |
|   |      |      | $R_{17} = +29.2$ | $S_7 = 0.12$ |
| 10 | 1.61 | 58.8 | $R_{18} = -138$ | $t_{10} = 2.00$ | where from front to rear $R_1$ to $R_{18}$ are the radii of curvature of the surfaces, $t_1$ to $t_{10}$ the thicknesses of the elements, $S_1$ to $S_7$ the separations of the components, N the refractive indexes for the D line of the spectrum and V the dispersive indexes.

No references cited.

JEWELL H. PEDERSEN, *Primary Examiner.*

R. J. STERN, *Assistant Examiner.*